July 21, 1953

A. G. EMSLIE 2,646,561

MOVING OBJECT PULSE ECHO SELECTION
CIRCUIT FOR RADAR SYSTEMS

Filed April 30, 1946

INVENTOR
ALFRED G. EMSLIE
BY
William D. Hall.
ATTORNEY

Patented July 21, 1953

2,646,561

UNITED STATES PATENT OFFICE 2,646,561

MOVING OBJECT PULSE ECHO SELECTION CIRCUIT FOR RADAR SYSTEMS

Alfred G. Emslie, Boston, Mass., assignor, by mesne assignments, to the United States of America as represented by the Secretary of War Application April 30, 1946, Serial No. 665,993

13 Claims. (Cl. 343—7.7)

This invention relates to electrical apparatus and more particularly to comparison circuits employed in moving target radio object locating systems.

Radio object locating systems for locating the position of objects in space have been employed for a number of years. In this type of radio system a visual indication is usually provided that displays in map or graphic form azimuth, elevation or range data of all objects both fixed and moving within the region of space scanned by the system.

More recently radio object locating systems have been developed that present only data relating to moving objects; that is, data appearing on the visual indicator represents only objects moving with respect to the radio system or moving with respect to some reference such as the earth. Since all objects both fixed and moving reflect energy that will be detected by the system receiver, it is necessary to separate radio echoes representing moving objects from radio echoes representing stationary objects. This is done in the receiver channel of the radio system.

The separation of the two types of radio echoes is usually accomplished in the following manner. The returning radio echoes are combined with a reference oscillation that is fixed in phase with respect to the pulses of radio energy transmitted by the system. Individual echoes in a train of echoes returned from any stationary object will always bear a fixed phase with respect to this reference oscillation since the distance between the radio system and the echo returning object is constant. The combination of the train of echoes from any specific stationary object with the reference oscillation results in a train of signals of fixed amplitude.

The distance from the radio system to moving objects is not constant; therefore, echoes returned from moving objects will have a variable phase with respect to the reference oscillation. It can be shown that the signals resulting from the combination of the reference oscillation with a train of echoes from a moving object will result in a train of signals having a cyclic variation in amplitude. Distinguishable characteristics for echoes from fixed and moving objects have thus been established; signals representing fixed objects have a constant amplitude while signals representing moving objects are variable in amplitude.

To separate the two types of signals a circuit known in the art as a comparator is normally employed. In one of its simple forms it comprises a linear mixer having two signal inputs. Undelayed video signals are applied to one input of the mixer and signals that have been inverted and delayed by a period equal to the time interval between successive transmitted pulses are applied to a second input. It can be seen that, since successive echo pulses from fixed objects are equal in amplitude, no output signal will be obtained from the mixer if successive signals are applied simultaneously to the input of the mixer as they are in this example. On the other hand, a signal will be obtained from the output of the mixer when successive signals representing a moving object are simultaneously applied to the input of the mixer due to the difference of amplitude of these successive signals. The signals in the output of the mixer are substantially similar in character to signals normally present in the output of a radio object locating system receiver; therefore, they may be applied directly to the system indicator if desired and only indications representing moving objects will then appear on the screen thereof.

One of the most important factors in the comparison phase is that the delay of signals applied to the mixer must be exactly equal to the time between successive transmitted exploratory pulses. This delay is usually accomplished with a supersonic delay line. The radio pulse transmitter must also be controlled or stabilized by the same or a similar delay line. Since the transmitter pulsing is controlled by a series of accurately spaced trigger pulses, the so-called hard tube type of modulator must be employed. It is usually more convenient to use a so-called spark gap modulator because of its simplicity. It has been impossible to use this type of modulator heretofore due to the variation in time spacing between successive transmitted pulses when this circuit is used.

It is an object of the present invention, therefore, to provide a circuit that will permit the use in a moving object radio detection system of a pulse transmitter the pulse repetition interval of which is not stabilized.

It is a more particular object of this invention to provide a circuit that will permit the use of spark gap modulator in a moving object radio detection system.

A further object of the present invention is to provide a circuit that will compensate for the variation in the period between successive pulses transmitted by a moving object radio detection system.

For a better understanding of the invention together with other and further objects thereof, reference is had to the following description to be read in connection with the accompanying drawings in which.

Figure 1:
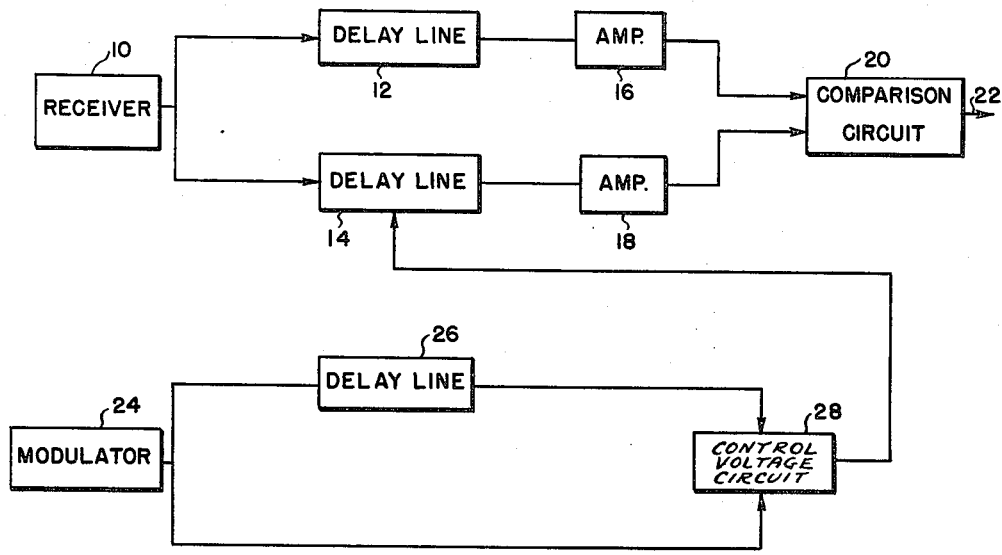
Fig. 1 is a schematic drawing in block form of the present invention.

In Fig. 1 a receiver 10 supplies identical signals to two delay lines 12 and 14. Receiver 10 is the radio receiver that forms a part of the radio object locating system. Delay line 12 is preferably of the supersonic delay type and should provide a time delay that is longer than the longest interval between any two successive exploratory pulses transmitted by the radio system associated with this circuit. Delay line 14 provides a variable time delay, this time delay being adjustable over a comparatively wide range. One preferred form of delay line 14 is the so-called positive ion delay line more fully described hereinafter. The output signals from delay lines 12 and 14 are applied through amplifiers 16 and 18 to two inputs of a comparison circuit 20. Comparison circuit 20 combines the outputs from delay lines 12 and 14 in a manner to provide at the output 22 a signal equal to the difference in amplitude of the two applied signals.

A modulator 24 provides activating signals for the radio system transmitter (not shown). Modulator 24 may be of any convenient type and, for purposes of illustration only, it may be assumed to be of the spark gap type. Modulator 24 supplies a trigger pulse to a delay line 26 and to a control voltage circuit 28 at the same time that the activating signal is applied to the transmitter. The time delay of line 26 should be less than the minimum time spacing between successive exploratory pulses. The output of delay line 26 is applied to a second input connection of control voltage circuit 28. The output signal from control voltage circuit 28 controls the time delay of signals passing through the delay line 14.

Figure 2:
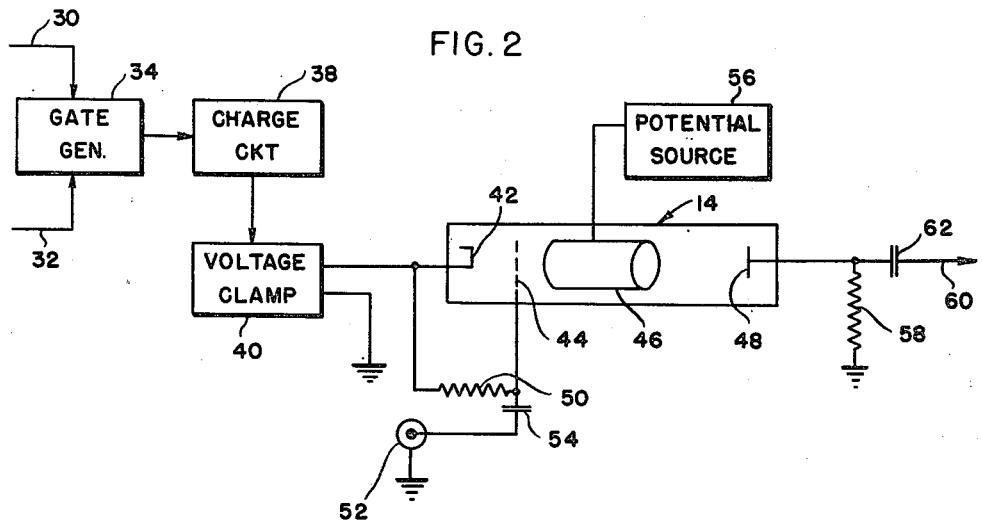
Fig. 2 is a more detailed drawing of a portion of the circuit of Fig. 1.

Fig. 2 illustrates in more detail the circuitry of control voltage circuit 28 and delay line 14.

In Fig. 2 two inputs 30 and 32 to a gate generator 34 provide means for introducing signals from the output of delay line 26 and modulator 24, respectively, of Fig. 1. The initial time of the voltage gates produced by generator 34 is determined by signals applied by way of connection 30 and these same voltage gates are terminated by signals applied by way of connection 32. The length of the voltage gate produced by generator 34 will, therefore, depend on the time interval between pulses in the output of delay line 26 and the next succeeding pulses in the output of modulator 24. The output of gate generator 34 controls a charging circuit 38. Charging circuit 38 may be any form of circuit that will produce a voltage that is some selected function, not necessarily a linear function, of the time that this circuit is made operative by gate generator 34. For purposes of illustration it will be assumed that the output potential of charging circuit 38 is a linear function of the length in time of the gate applied from generator 34. A voltage clamp circuit 40 connected to the output of circuit 38 provides means for maintaining for a specified interval a potential equal to the maximum potential produced by charging circuit 38. Many circuits of this type are well known in the art; therefore clamp circuit 40 will not be described in detail. A positive ion delay line 14 comprises a cathode 42, an intensity grid 44, an accelerating anode 46 which may also serve as a beam forming anode, and a collector anode 48. Cathode 42 of delay line 14 is connected to the output of voltage clamp 40 so that cathode 42 is maintained at a potential above ground equal to the potential supplied by clamp circuit 40. The intensity grid 44 is returned to cathode through a resistor 50 and grid 44 is also connected to a signal input 52 through a capacitor 54. Accelerating anode 46 is connected to a suitable potential source 56 that provides the necessary bias potential on anode 46 to accelerate the positive ions liberated by cathode 42. Collector anode 48 is connected to ground through a resistor 58 and to a signal output connection 60 through a capacitor 62. Output connection 60 is connected to amplifier 18 of Fig. 1.

In the circuit of Fig. 2, cathode 42 is held at a positive potential with respect to ground by an amount proportional to the time interval between triggers applied at connections 30 and 32 respectively. The more positive the potential on cathode 42 the shorter will be the transit time of positive ions traveling from cathode 42 to collector anode 48. Video signals from receiver 10 of Fig. 1 are applied to input connection 52 of Fig. 2 thus changing the potential of grid 44 with respect to cathode 42 so that a group of positive ions is allowed to pass from cathode 42 to collector anode 48 at each time that a video signal is applied to connection 52.

Figure 3:
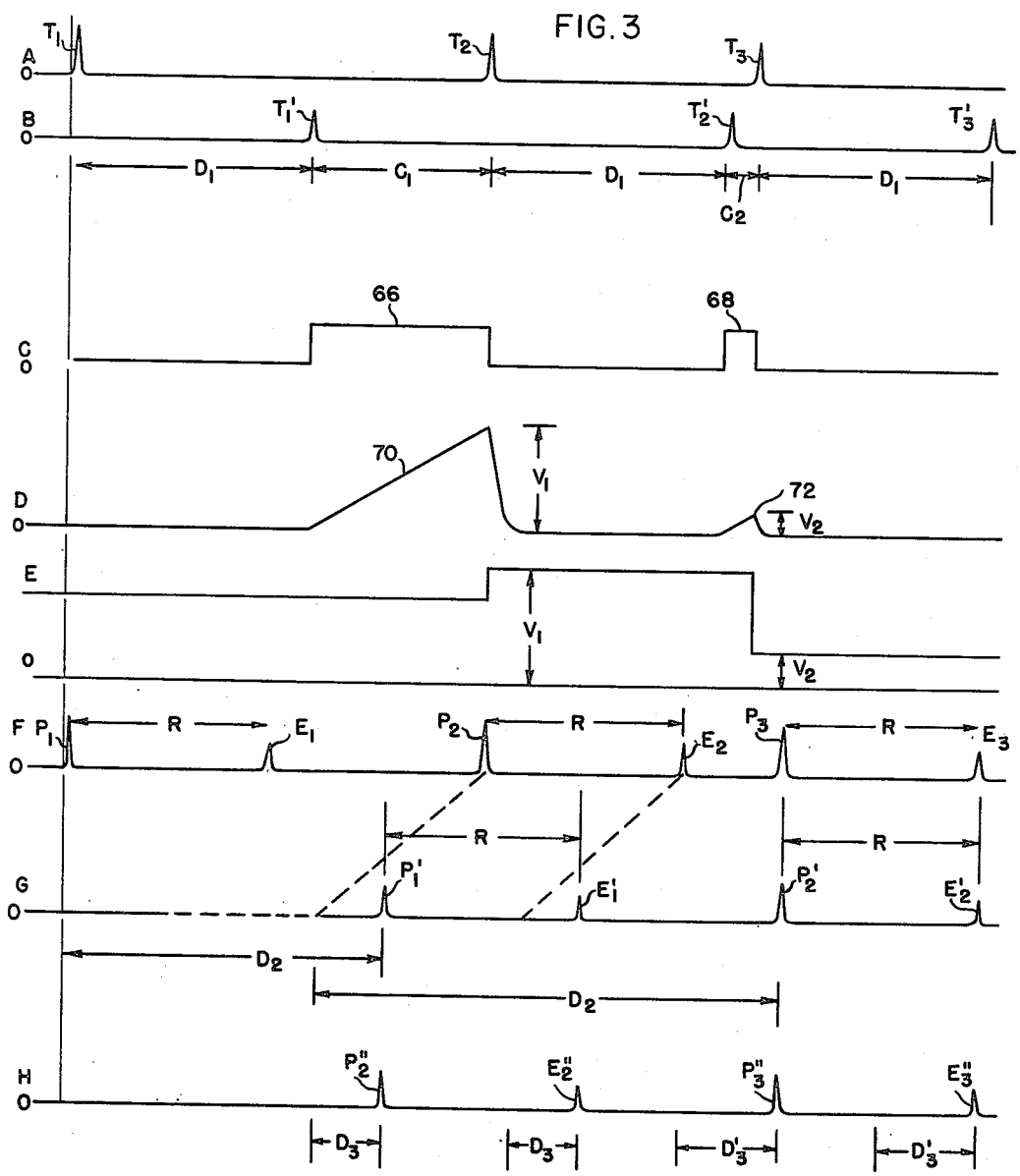
Fig. 3 is a series of typical waveforms that might be obtained at selected points in the circuit of Fig. 1.

The operation of the circuit shown in Fig. 1 may be best understood by reference to curves or waveforms shown in Fig. 3. In Fig. 3 voltage waveforms from various points in the circuit of Fig. 1 have been plotted against a common time scale that forms the abscissa of all curves. For convenience in the drawing, the time bases of Figs. 3G and 3H have been shifted to the left as indicated by diagonal dotted lines drawn between corresponding time points in Fig. 3F and Fig. 3G. The time scales of Figs. 3G and 3H are exactly the same as the time scales of the remaining waveforms in Fig. 3.

In Fig. 3A there is shown a series of trigger pulses namely $T_1$, $T_2$, and $T_3$ that represent output triggers from modulator 24. The trigger pulses shown in Fig. 3A are applied through delay line 26 to control voltage circuit 28 and directly from modulator 24 to a second input of control voltage circuit 28. Fig. 3B illustrates trigger pulses in the output of delay line 26. Pulses $T_1'$, $T_2'$, and $T_3'$ correspond to pulses $T_1$, $T_2$, and $T_3$ in Fig. 3A. The delay time between pulse $T_1$ and the corresponding pulse $T_1'$, herein shown as delay time $D_1$, is equal to the time delay in delay line 26. This time delay should be less than the minimum spacing between any two successive pulses in Fig. 3A. In this example pulse $T_1'$ in Fig. 3B activates control voltage circuit 28 and causes gate generator 34 of Fig. 2 to be made operative. At a slightly later time pulse $T_2$ in Fig. 3A will cause generator 34 to be made inoperative and thus limit the length of the gate produced by generator 34. The length of the gate produced in this case is designated by the time $C_1$ in Fig. 3. Pulse $T_2'$ will again activate generator 34 and after a time interval designated herein as $C_2$, pulse $T_3$ of Fig. 3A will deactivate generator 34. Fig. 3C illustrates the pulses or voltage gates produced by gate generator 34. The first gate produced by generator 34, in this example gate 66, will have a time duration equal to interval $C_1$ while the second gate 68 will have, in this case, a shorter time duration, this time duration being equal to the time interval $C_2$. It should be understood that the length of the voltage gates produced by a generator 34 depend only on the relative spacing of pulses in the output of modulator 24 and, therefore, the length of these gates will usually vary in a random manner. Fig. 3D illustrates the output signal from charging circuit 38 of Fig. 2. As before stated, the maximum potential of the output signal from charging circuit 38 will depend upon the length of the gate produced by generator 34. In this example signal 70 of Fig. 3D will have a higher amplitude $V_1$ than the amplitude $V_2$ of signal 72 of this same figure due to the fact that gate 66 in Fig. 3C is of longer time duration than gate 68. Fig. 3E illustrates the signal output of voltage clamp circuit 40 and therefore the signal applied to the cathode 42 of delay line 14 at the end of signal 70, that is, after the time of occurrence of pulse $T_2$. The cathode 42 of delay line 14 will be clamped at a potential $V_1$ above ground. $V_1$ is equal to the maximum amplitude of signal 70 in Fig. 3D.

At a time corresponding to the time of occurrence of pulse $T_3$ in Fig. 3A, the potential on cathode 42 will drop to a potential $V_2$ above ground corresponding to the maximum potential $V_2$ of signal 72 in Fig. 3D. Pausing briefly to note the effect of this change in potential on delay line 14 it can be seen that the delay of signals passing through delay line 14 between the time of occurrence of pulses $T_2$ and $T_3$ will be less than the time delay of signals occurring between pulse $T_3$ and the next succeeding pulse (not shown) due to the fact that cathode 42 is at a higher potential during the former time interval and therefore the velocity of the positive ions traveling from cathode 42 to anode 48 will be greater.

Video signals in the output of receiver 10 of Fig. 1 are illustrated in Fig. 3F. Pulses $P_1$, $P_2$, and $P_3$ represent successive transmitted exploratory pulses while pulses $E_1$, $E_2$, and $E_3$ represent a series of signals returned from a single reflecting object or target. Signal $E_1$ occurs at a time after pulse $P_1$ equal to the time interval R. Similarly pulse $E_2$ occurs after pulse $P_2$ and pulse $E_3$ occurs after pulse $P_3$ by the same time interval R. It is this time interval R that indicates the range from the radio system of the target producing pulses $E_1$, $E_2$, and $E_3$. Fig. 3G illustrates the output of delay line 12 or amplifier 16 of Fig. 1. Pulse $P_1'$ occurs at a time after pulse $P_1$ in Fig. 3F equal to interval $D_2$ and pulse $P_2'$ occurs at the same time interval $D_2$ after pulse $P_2$ in Fig. 3F. Pulses $E_1'$ and $E_2'$ occur after $P_1'$ and $P_2'$ respectively, by a time interval equal to time interval R of Fig. 3F. The time interval, therefore, between pulse $E_1'$ and pulse $E_1$ and pulse $E_2'$ and pulse $E_2$ will also be equal to the time interval $D_2$. The time delay $D_2$ of delay line 12 should be greater than the maximum spacing in time between successive pulses in Fig. 3A.

Fig. 3H illustrates the signals in the output of delay line 14 and amplifier 18. The signals at these two points occur at identical times. Pulse $P_2''$ occurs after pulse $P_2$ of Fig. 3F by a time interval $D_3$ which is the time delay of delay line 14. In a similar manner pulse $E_2''$ of Fig. 3H occurs at a time interval $D_3$ after pulse $E_2$ of Fig. 3F where again interval $D_3$ is equal to the time delay of delay line 14. The circuit has been so adjusted that pulses $P_2''$ and $P_1''$ correspond in time and also pulses $E_2''$ and $E_1''$ correspond in time. This may be accomplished by properly selecting the potential to which charging circuit 38 will charge when activated by a voltage gate having a width $C_1$. Pulse $P_3''$ and pulse $E_3''$ occur after pulses $P_3$ and pulse $E_3$ respectively of Fig. 3F by a time delay $D_3'$ where $D_3'$ is the new time delay of delay line 14. In this example $D_3'$ is greater than $D_3$ due to the fact that the potential on the cathode 42 of delay line 14 is lower after pulse $T_3$ than it is during the time between pulse $T_2$ and pulse $T_3$. Again, delay $D_3'$ is just sufficient to cause pulse $P_3''$ and pulse $E_3''$ to correspond in time to pulses $P_2'$ and $E_2'$ respectively of Fig. 3G.

If the circuit constants of charging circuit 38 and delay line 14 are properly selected the interval $D_3$, $D_3'$ and other corresponding delay intervals produced by delay line 14 will be just that value necessary to cause coincidence between corresponding pulses in Figs. 3G and 3H, that is to say, corresponding pulses at the two inputs to comparison circuit 20 of Fig. 1 will occur at identical times. If pulses $E_1$, $E_2$ and $E_3$ represent a moving target an output will be obtained from comparison circuit 20 at output 22. If, however, these pulses represent a stationary target, no output will be obtained at connection 22. As far as this invention is concerned, however, it makes no difference whether the pulses represent a moving target or a stationary target since this invention deals only with the spacing between pulses and not the amplitude of the pulses.

Some of the advantages of this circuit are:

(1) A spark gap modulator may now be employed in a radio object locating system if this invention is also employed;

(2) The circuit of this invention may be employed in any type of moving target radio object locating system to compensate for the variations in spacing in time of successive pulses transmitted by the system.

Other advantages of this circuit will be immediately obvious to those skilled in the art.

While there has been described what is at present considered to be the preferred embodiment of this invention, it will be obvious to those skilled in the art that various changes and modifications may be made therein without departing from the scope of the invention as set forth in the appended claims.

What is claimed is:

1. In a radio object locating system, the combination including a sparkgap modulator constituting a first source of pulse signals, a radio pulse receiver constituting a second source of pulse signals, and a comparison circuit having two inputs thereto, a pulse coincidence circuit comprising a first and a second fixed delay line, a variable delay line, means for applying pulse signals from said second source to said variable delay line and to said first fixed delay line, means for applying the output of said variable delay line to one input of said comparison circuit, means for applying the output of said first fixed delay to the remaining input of said comparison circuit, a control voltage circuit having two inputs and providing a unidirectional potential proportional in amplitude to the spacing in time of two input signals, means for connecting said modulator to one input to said control voltage circuit, means for connecting said modulator to the remaining input of said control voltage circuit through said second fixed delay line, means for applying the output of said control voltage circuit to said variable delay line in a manner to control the delay time thereof so that selected signals present at the first input of said comparison circuit correspond in time to other selected signals present at the second input to said comparison circuit regardless of the spacing of pulses in the output of said modulator.

2. A device for obtaining coincidence of signals in the receiver channel of a moving target radio locating system utilizing variably spaced exploratory pulses, said device including means for delaying given signals in the output of said receiver by a fixed amount, and means for delaying signals, succeeding said given signals in the output of said receiver, by a variable amount determined by the time interval between the successive exploratory pulses corresponding to said given and succeeding signals transmitted by said system so that said given signals correspond in time to said succeeding signals.

3. A device for obtaining coincidence of selected signals of first and second groups of signals derived from third signals, said device including means for delaying the first group of signals by a fixed amount, and means for delaying the second group of signals by a variable amount controlled by the time spacing of the third signals so that said selected signals in said first and said second group of delayed signals occur in time coincidence.

4. In apparatus including a first source of pulse signals and a second source of pulse signals wherein the time of occurrence of signals from said second source is determined in part by signals from said pulse source, a circuit for causing selected signals in the output of said second pulse source to occur in time coincidence with other selected signals in the output of said second source, said circuit comprising a first, a second, and a third delay means, means for applying the output of said second pulse source to the inputs of said first and said second delay means, means for generating a voltage representing the interval between a pair of pulses, means for applying the output of said first pulse source directly to one input of said voltage generating means, means for applying the output of said first pulse source to a second input of said voltage generating means through said third delay line, and means for applying the output of said voltage generating means to said second delay line to control the delay thereof so that the above-mentioned selected signals appear at the outputs of said first and said second delay lines respectively in the desired time coincidence.

5. A radar system comprising means for initiating exploratory pulses, a pulse echo receiver, circuit means for producing an output corresponding to the voltage difference between a pair of input signals impressed thereon, means connected to said receiver for impressing on said circuit means a received echo signal derived from a given exploratory pulse, variable delay means connected to said receiver for variably delaying a received echo signal derived from an exploratory pulse adjacent to said given exploratory pulse and for impressing said delayed signal on said circuit means, and means for varying the delay period of said delay means in response to the length of the interval between the said given and adjacent exploratory pulses so that one of said received echo signals is delayed with respect to the other received signal for a time equal to the interval between said exploratory pulses.

6. In a moving object radio locating system, apparatus for distinguishing fixed object from moving object pulse echoes including a pulse generator, a radio pulse receiver, and a pulse comparison circuit having two inputs thereto, a pulse coincidence circuit comprising a fixed delay line, a variable delay line, means for applying pulse signals from said receiver to said variable delay line, means for applying the output of said variable delay line to one input of said comparison circuit, means for applying the output of said receiver to the remaining input of said comparison circuit, a control voltage circuit having two inputs for providing a unidirectional potential corresponding in amplitude to the spacing in time of two input pulse signals, means for connecting said pulse generator to one input to said control voltage circuit, means for connecting said pulse generator to the remaining input of said control voltage circuit through said fixed delay line, means for applying the output of said control voltage circuit to said variable delay line to control the delay time thereof so that selected signals present at the first input of said comparison circuit corresponds in time to other selected signals present at the second input to said comparison circuit regardless of the spacing of pulses in the output of said pulse generator.

7. In a radio object locating system, apparatus for distinguishing fixed object from moving object pulse echoes including a pulse generator, a radio pulse receiver, and a pulse comparison circuit having two inputs thereto, a pulse coincidence circuit comprising a variable delay line, means for applying pulse signals from said receiver to said variable delay line, means for applying the output of said variable delay line to one input of said comparison circuit, means for applying the output of said receiver to the remaining input of said comparsion circuit, a control voltage circuit for providing a unidirectional potential corresponding in amplitude to the spacing in time of two input pulse signals, means for connecting said pulse generator to an input to said control voltage circuit, means for applying the output of said control voltage circuit to said variable delay line to control the delay time thereof so that selected pulse echo signals present at the first input of said comparison circuit corresponds in time to other selected pulse echo signals present at the second input to said comparison circuit regardless of the spacing of pulses in the output of said pulse generator.

8. The apparatus defined in claim 7, wherein said variable delay line includes a positive ion delay tube.

9. In a radio object locating system, apparatus for distinguishing between fixed object and moving object echoes including a pulse modulator, a radio pulse receiver, and a pulse comparison circuit having two inputs thereto, a pulse coincidence circuit comprising a fixed delay line, a variable delay line, means for applying pulse signals from said receiver to said variable delay line and to said fixed delay line, means for applying the output of said variable delay line to one input of said comparison circuit, means for applying the output of said fixed delay line to the remaining input of said comparison circuit, a control voltage circuit for providing a unidirectional potential corresponding in amplitude to the spacing in time of two input pulse signals, means for connecting said modulator to said control voltage circuit, means for applying the output of said control voltage circuit to said variable delay line to control the delay time thereof so that selected pulse echo signals present at the first input of said comparison circuit corresponds in time to other selected pulse echo signals present at the second input to said comparison circuit regardless of the spacing of pulses in the output of said modulator.

10. In a radio object locating system, the combination including a pulse modulator, a radio pulse receiver, and a pulse comparison circuit having two inputs thereto, a pulse coincidence circuit comprising a fixed delay line, a variable delay line, means for applying pulse signals from said receiver to said variable delay line and to said fixed delay line, means for applying the output of said variable delay line to one input of said comparison circuit, means for applying the output of said fixed delay line to the remaining input of said comparison circuit, means connecting said modulator to said variable delay line for controlling the delay time thereof so that selected pulse echo signals present at the first input of said comparison circuit corresponds in time to other selected pulse echo signals present at the second input to said comparison circuit regardless of the spacing of pulses in the output of said modulator.

11. A radar system comprising means for initiating exploratory pulses, a pulse echo receiver, first means for delaying a received echo pulse derived from a given exploratory pulse for a period greater than the interval between said given exploratory pulse and the next succeeding exploratory pulses, second means for variably delaying a received echo pulse derived from said succeeding exploratory pulse, means for varying the delay period of said second delay means in response to the length of said interval, said first and second means having inputs connected to said receiver, and circuit means connected to said first and second means for producing an output corresponding to the difference between the outputs of said first and second means.

12. The system defined in claim 11, wherein said second delay means includes a positive ion discharge tube having positive ion velocity control means.

13. The system defined in claim 12 including means connected to said positive ion tube for controlling the positive ion current therein in response to received echo pulses.

ALFRED G. EMSLIE.

References Cited in the file of this patent

UNITED STATES PATENTS

| Number | Name | Date |
| --- | --- | --- |
| 2,054,676 | La Pierre | Sept. 15, 1936 |
| 2,209,064 | Nyguist | July 23, 1940 |
| 2,406,316 | Blumlein et al. | Aug. 27, 1946 |
| 2,407,294 | Shockley et al. | Sept. 10, 1946 |
| 2,408,742 | Eaton | Oct. 8, 1946 |
| 2,419,541 | De Rosa | Apr. 29, 1947 |
| 2,514,924 | Becker | July 11, 1950 |
| 2,523,283 | Dickson | Sept. 26, 1950 |
| 2,532,546 | Forbes | Dec. 5, 1950 |